United States Patent [19]

Patterson et al.

[11] Patent Number: 5,680,314
[45] Date of Patent: Oct. 21, 1997

[54] GARMENT SIZING SYSTEM

[76] Inventors: Douglas R. Patterson; Carol L. Patterson, both of 2469 Waldemere St., Sarasota, Fla. 34239

[21] Appl. No.: 519,236

[22] Filed: Aug. 25, 1995

[51] Int. Cl.$^6$ .................................................. G06F 19/00
[52] U.S. Cl. .................. 364/470.03; 364/470.02; 364/470.05
[58] Field of Search ............. 364/470.03, 468.04, 364/470.01, 470.02, 470.05, 470.06, 468.13; 395/10; 2/69, 70, 79; 112/453, 454, 458

[56] References Cited

U.S. PATENT DOCUMENTS

| | | |
|---|---|---|
| 858,903 | 3/1907 | Wier . |
| 899,802 | 9/1908 | Pohle . |
| 1,000,978 | 9/1909 | Rawson . |
| 1,221,302 | 4/1917 | Fischer . |
| 1,248,510 | 12/1917 | Levi . |
| 1,732,369 | 10/1929 | Leeman . |
| 2,374,654 | 5/1945 | Cooke ............................ 33/15 |
| 3,091,861 | 6/1963 | Jones et al. ..................... 33/15 |
| 3,685,155 | 8/1972 | Oblander ........................ 33/11 |
| 3,832,780 | 9/1974 | Lewis ............................. 33/15 |
| 4,149,246 | 4/1979 | Goldman ........................ 364/470 |
| 4,598,376 | 7/1986 | Burton et al. .................. 364/470.03 |
| 4,675,253 | 6/1987 | Bowditck ....................... 428/542.8 |
| 4,916,634 | 4/1990 | Collins et al. .................. 364/470.03 |
| 5,163,006 | 11/1992 | Deziel ............................ 364/470.03 |
| 5,163,007 | 11/1992 | Slilaty ........................... 364/470 |
| 5,341,305 | 8/1994 | Clarino et al. ................. 364/470.03 |
| 5,438,520 | 8/1995 | Satoh et al. .................... 364/470.03 |

FOREIGN PATENT DOCUMENTS

| 17071 | of 1928 | Australia . |
|---|---|---|
| 16525 | 8/1894 | Germany . |

OTHER PUBLICATIONS

"Master Mode Dimension Designing", Sarasota Journal, May 29, 1980.
"Apparel Made to Measure", Bobbin, Mar., 1983.
"Veteran Western Designer Carol Collins", Southern Horseman, Jul., 1986.
"You and Your Jeans", Southern Horseman, Jul., 1986.
"Super Fit Is Making A Difference", Horse Country, Oct., 1986.
"AccuMark Made-to-Measure System" brochure by Gerbe Garment Technology, Inc., 1994.
"Levi offers made-to-order jeans", N.Y. Times News Service, Nov. 9, 1994.
"Levi Strauss Searches Its Soul", Apparel Industry Magazine, Jan., 1995.
"L.S.& Co. Tries On Custom-Fit Jeans", Apparel Industry Magazine, Jan., 1995.
"Master Model Dimension Designing" brochure, 1986.
"Carol Collins" the Leading Custom Designer Pants brochure, 1980.
Videotape: "Superfit", Carol Patterson, on information and belief, 1986 or 1987.
"Master Model Dimension Designing", Sarasota Journal, May 29, 1980.

Primary Examiner—Paul P. Gordon
Attorney, Agent, or Firm—Banner & Witcoff, Ltd.

[57] ABSTRACT

A system for providing custom tailored garments for a customer. The system includes a measuring unit for gathering size data corresponding to said customer, a data collection device for collecting input data relating to the size data, customer data corresponding to said wearer, and product data corresponding to a made-to-order garment. The system includes a data storage memory for storing the input data. The system also includes a text output file containing a plurality of data records. Each of said data records corresponds to an order for a made-to-order garment. The system further includes a data processing unit comprising a data processor. The data processor periodically transfers data from said pending database to said main database. The data processor also updates the text output file to include additional data records corresponding to additional customer orders, and supplies the text output file to an automated curing table for cutting made-to-order garments.

14 Claims, 6 Drawing Sheets

Please print in block capital letters using black ink only. Felt tip pen preferred. Do not let letters touch the sides of the boxes.

YOUR COMPANY LOGO HERE

Customer Code (Repeat Orders)

For *repeat orders*, fill in Customer Code, Sales Clerk ID, Store ID, Order Date, and signature only.

Last Name

Home Telephone

First Name    MI

Street Address

City    State    ZIP

I am satisfied with the size of the garment I am ordering and agree to accept it. I have verified the measurements on this form and they match the Master Model color coding. If any changes are needed for the next order I will inform you before placing the order.

Sales Clerk ID    Store ID    Order Date    Customer's Signature

Darken desired circle completely with black ink.

Master Model Unit Number

M1  M2  M3  M4  M5  M6  F1  F2  F3  F4  F5  F6
 o   o   o   o   o   o   o   o   o   o   o   o

| Waist | Upper Hip | Hip | Upper Thigh | Mid Thigh | Knee | Bottom |
|---|---|---|---|---|---|---|
| o Red | o Red | o Red | o Red | o Red | o Red | o Red |
| o Green | o Green | o Green | o Green | o Green | o Green | o Green |
| o Gold | o Gold | o Gold | o Gold | o Gold | o Gold | o Gold |
| o Blue | o Blue | o Blue | o Blue | o Blue | o Blue | o Blue |
| o White | o White | o White | o White | o White | o White | o White |
| o Pink | o Pink | o Pink | o Pink | o Pink | o Pink | o Pink |

Leg Length Mark (# of marks showing)

1  2  3  4  5  6  7  8  9  10  11
o  o  o  o  o  o  o  o  o  o   o

Factory Use Only

GARMENT SIZING SYSTEM

FIELD OF THE INVENTION

The present invention relates to an improved system and method for large scale production of individually sized garments, such as pants and shirts.

BACKGROUND OF THE INVENTION

Garments available in a clothing store, such as pants and shirts, are generally available in a limited number of sizes. Those desiring individually sized garments have been required to hire tailors to sew custom clothes. This process is generally expensive and slow. Moreover, the traditional method of measuring a person and sewing a garment based on those dimensions does not always produce satisfactory results. Garments should be selected based on how they look and feel. However, this type of selection is not possible with the traditional method.

At the same time, the clothing industry is moving toward mass customization, that is, large scale production of individually sized garments. Other systems have been developed for measuring, such as body scanning, but these technologies provide no practical advantage over the measuring tape because they still acquire body size only, not desired garment size. The customer does not have the opportunity to see and feel the fit of the finished garment before it is produced. Moreover, body scanning equipment is very expensive. Other systems require measuring tape measurements and multiple sample "try-on" garments.

Years ago, the U.S. government created body dimension standards based on body measurements of military personnel. Some garment manufacturers have based their patterns on this standard, while others have maintained that this data is inaccurate and does not reflect current sizing of the public, and does not reflect current sizing trends. Accordingly, clothing manufacturers can only develop educated guesses as to sizing preferences. In addition, sizing standards employed by different garment manufacturers vary widely. For example, a women's size 10 made by one manufacturer may be dramatically different than a size 10 made another manufacturer. Because they cannot rely on sizing information, consumers are thus forced to either spend excessive time trying on garments, risk purchasing garments that do not fit, or purchase nothing.

SUMMARY OF THE INVENTION

As illustrated by the preferred embodiment of the invention, to be described, the present invention, in a principal aspect, relates to a system for providing custom tailored garments for a customer. The system includes a measuring unit for gathering size data corresponding to the customer, a data collection device for collecting input data relating to the size data, customer data corresponding to the wearer, and product data corresponding to a made-to-order garment.

The system includes a data storage memory for storing the input data. The data storage memory defines a pending database for temporary storage of the input data, and a main database that includes a plurality of relational tables relating the customer data, the size data and the product data.

The system also includes a text output file containing a plurality of data records. Each of the data records corresponds to an order for a made-to-order garment, and each of the data records comprises at least one data field corresponding to the garment sizing parameters. The system further includes a data processing unit comprising a data processor. The data processor periodically transfers data from the pending database to the main database. The data processor also generates the text output file, updates the text output file to include additional data records corresponding to additional customer orders, and supplies the text output file to an automated cutting table for cutting made-to-order garments.

It is thus an object of the present invention to provide an improved system for custom fitting garments. A further object of the invention is an improved method for gathering, processing and analyzing data corresponding to desired sizing. Another object of the invention is a system that allows a customer to select custom fitted garments based on the actual "see and feel" of the garments.

Yet another object of the present invention is a more economical system for preparing individually sized garments on a large scale. A further object of the invention is a system that reduces problems in cutting custom garments caused by human error. It is also an object of the present invention to mass produce custom sized garments more quickly and reliably.

A further object of the invention is a system to collect a master database of sizing preferences and trends. Another object of the invention is a garment sizing system that does not require multiple try-on garments. Yet a further object of the invention is a system that reduces inventory requirements. An additional object of the invention is a system that provides durable and rugged sizing units.

These objects and other features of the present invention may be better understood by considering the following detailed description of the invention. In the course of the description, reference is made to the attached drawings.

DETAILED DESCRIPTION OF THE PREFERRED EMBODIMENT

Figure 1:
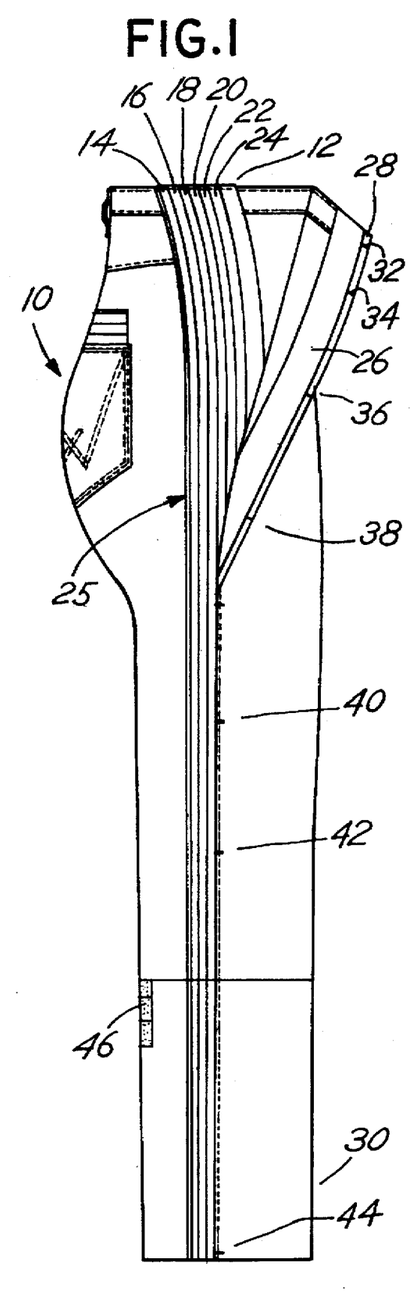
FIG. 1 is a side view of a garment measuring unit.

Referring to FIG. 1, the present invention includes a measuring unit 10 for measuring custom-sized garments, sometimes referred to as a "Master Model" measuring unit. The measuring unit 10 is used for measuring pants such as jeans. Similar units and patterns can also be used for other garments, such as shirts, skirts, blazers, hats, shoes, chaps, horse equipment and the like.

The measuring unit 10 is, in effect, a partially finished garment with open extended overlapping seams. The measuring unit 10 consists of an adjustable pair of pants with measuring indicia attached to open seams, as seen at 12. A series of six colored lines of thread, 14, 16, 18, 20, 22 and 24, run longitudinally along the length of the open seam 12.

These lines are spaced at ½" intervals on a wide black Velcro loop strip 25. The Velcro strip 25 is sewn to the edge of the garment to allow adjustment of the garment to various sizes. The strips are color coded on both sides of the garment. For example, thread line 14 is yellow, thread line 16 is red, and the like. Other marking indicia, such as numbers, letters, or dots could also be used. The measuring unit 10 includes a similar strip configuration on the customer's left hand side (not shown).

An open flap 26 is opposite the open seam 12. The open flap 26 includes a strip of hook Velcro 28. The open seam is extended to allow for plenty of overlap for the measuring process.

When a customer puts on the measuring unit 10, the side seams are adjusted over the customer to obtain the desired fit and drape of the unit 10 on the customer. The hook strip 28 of the seam 12 is aligned with the loop strip 25 of the open flap 26 to obtain a desired fit. In addition to Velcro, other fastening devices, such as clips or snaps, may also be used as holding means. The person taking the measurements, the clerk, adjusts the side seam 12 to ensure the same color is exposed at the same measuring point of overlap on both sides to assure the measurements are symmetrical, until the garment fits in the desired manner.

The measuring unit 10 also includes a leg extension apparatus 30 attached at the bottom of the main body just below the knee. The leg extension apparatus also uses an overlapping seam with color coding. The bottom of this apparatus 30 is a measurement point. By varying this measurement the customer can create any style from a wide flair pants to narrow peg-leg pants. The measuring unit 10 also includes stabilizing straps sewn in at measurement points to prevent stretching and maintain accuracy.

Measurements are taken along a range of longitudinal, or vertical, parameters along the customer's waist, as seen at 32, upper hip, as seen at 34, lower hips and upper thighs, as seen at 36 and 38, mid thigh area, as seen at 40, knee area as seen at 42, and bottom, as seen at 44. The desired garment measurements are then recorded.

The measuring unit 10 also includes a number of horizontal lines, shown generally at 46, sewn to a piece of Velcro attached to the unit. The horizontal lines 46 are used to determine the desired length of the inseam. The clerk determines the number of horizontal lines 46 showing and records this information.

Thus, the measuring unit is adjustable to allow the customer to "see and feel" the fit on the customer's body before ordering. The measuring unit 10 thus becomes a designer's aid, whether the designer is the customer or a trained designer assisting the customer in finding a flattering fit. In addition, a customer may try on different design options. For example, a customer can try different styles and sizes of pockets to see which is most flattering.

The measuring unit may come in a variety of gross sizes to simplify the measurement process. For example, a larger unit may be used with large customers and a small unit may be used with small customers.

Based on the number of measurements possible at each measurement location, there are millions of distinct sizes possible, although many of these sizes would define unlikely shapes. This means that the system can accommodate every conceivable body form and shape.

Figure 2:
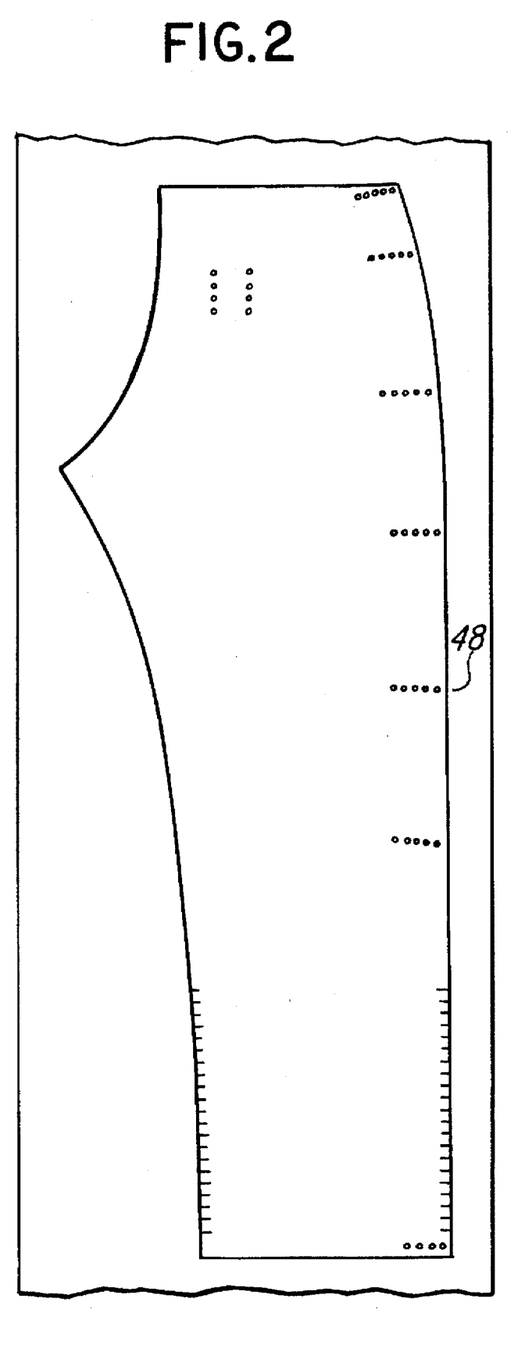
FIG. 2 is a side view of a garment template for use with the garment measuring unit of FIG. 1.

FIG. 2 shows a template based on the measuring unit. This template is used for hand or manual production. For example, the measurements taken at the measurement points 40 correspond to the group of dots shown at 48. Each of these dots corresponds to one of the lines 14–24 at point 40. Based on the color indicator at each of the measurement points, the template provides a pattern for the desired garment dimensions by connecting the various dots corresponding to the appropriate color indicator.

Figure 3:
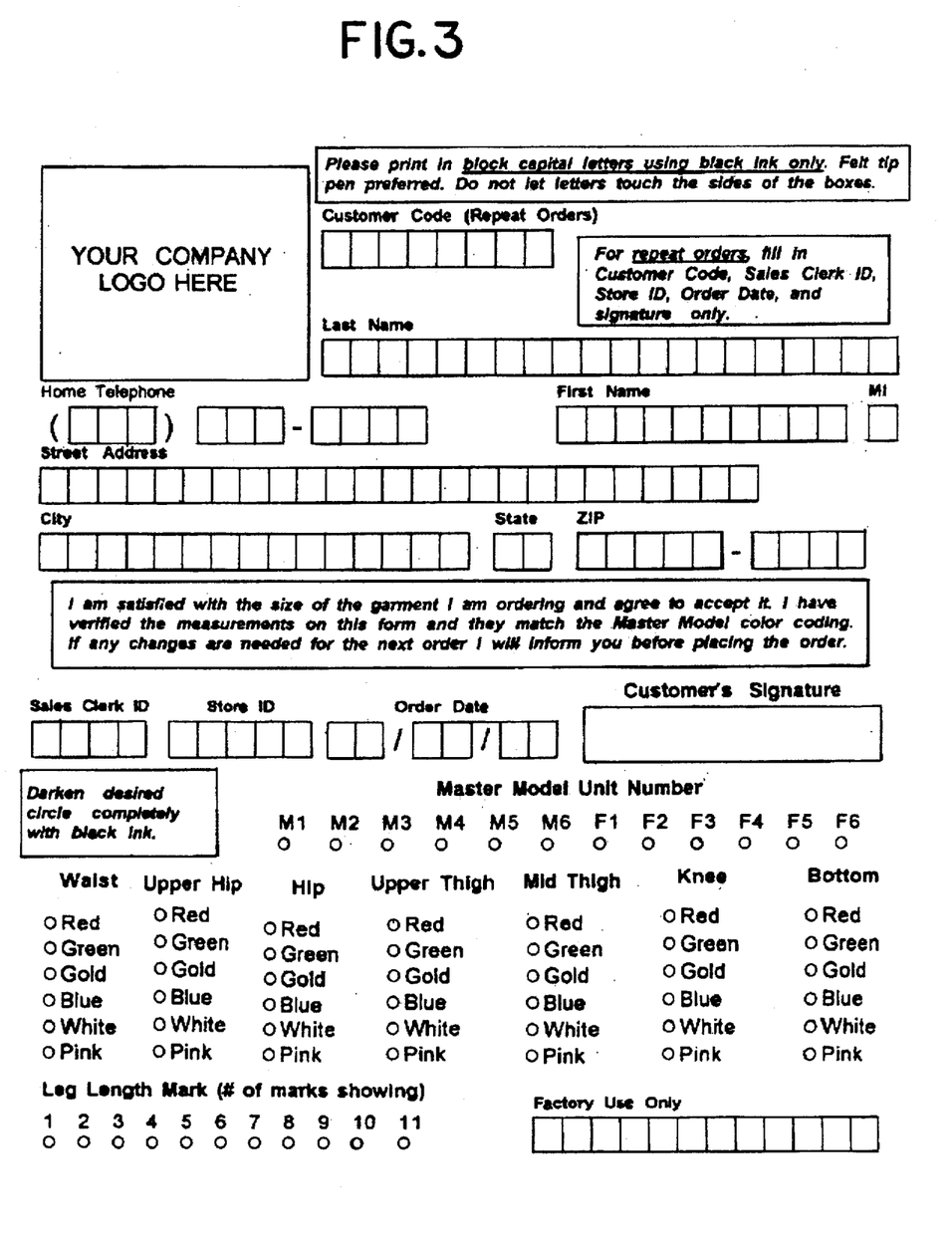
FIG. 3 is sample form generated by the "TeleForm for Windows" program, version 4, by Cardiff Software, used in the present invention.

The clerk takes the measurements from the measuring unit and records this data, also referred to as size data on an order form. The clerk also collects customer information about the customer, such as name and address, and product information about the particular product being sized. This size data, customer data and product data is collectively referred to as input data. The clerk then transmits this form by facsimile to the factory or data processing center where it is read by software. Alternatively, measurement, customer and product data may be sent from the clerk via other data communication channels, including manual or electronics means, such as via oral telephone communication, via modem or other electronic means such as electronic mail. FIG. 3 shows a sample form. As is further explained, it is not always necessary to collect every piece of input data, for example where the customer is a repeat customer and customer data or size data relating to that customer has already been recorded. In such a situation, the clerk may, for example, simply enter the customer identification number and product data.

At the factory, a computer receives order forms transmitted by facsimile from the points of sale. Unless the point of sale does not have a fax machine, no manual data entry is required. The computer will then verify the data from the faxed forms and flag errors if any are found. Orders flagged for review are held in a suspense file until an operator corrects them. If orders are received by mail, an operator may scan them using a scanner. Input data on the form may also be input into a computer via manual means, optical character recognition, scanning or the like, or directly if the input data not already in electronic format.

The computer at the factory includes a data processor, data storage memory, keyboard, and displays means, such as a monitor. In a preferred embodiment the form is created and read by the "TeleForm for Windows" program, version 4, by Cardiff Software. This application creates forms for collecting data, and gathers and interprets data from completed forms received by fax machine or scanner. It also has a manual entry mode ("form fill") for orders placed by telephone, although it is expected that manual data entry mode will probably be used infrequently. Measurement, customer and product data is stored by the computer in a PENDING database. An order only gets into the PENDING database after the "TeleForm" program has already interpreted incoming orders received by fax, scanner, or "form fill" manual entry at the operator's console. The TeleForm program is programmed to create a new customer ID code if none is entered on the form. It also creates an order number for all pending orders. At regular intervals, the "TeleForm" program reads in data from the PENDING database.

Figure 4:
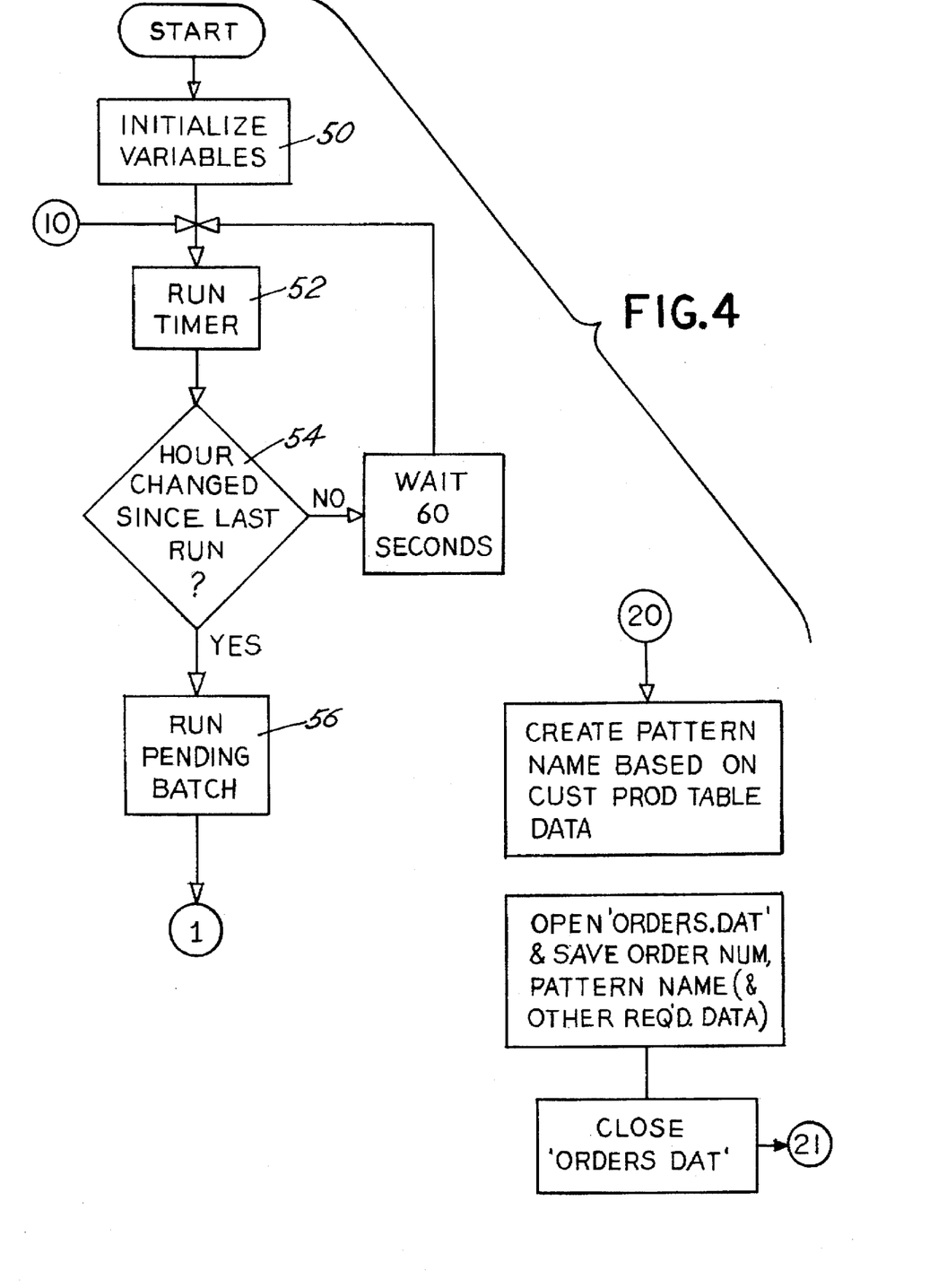
FIG. 4 is a flowchart depicting operation of the software of the preferred embodiment of the invention.

Referring to FIG. 4, when the program is first started, it initializes global variables, as shown at 50. The main screen is then displayed. This screen contains the menu of commands: a maintenance function and program exit. The maintenance function provides the user with two choices: "Compress Database" and "Repair Database." The menu will probably not be used by the operator, but only by the system administrator. Selection of the Exit function shuts down the program. When the program is started, a timer also starts to run, as shown at 52. At times pre-set by the program operator, for example, every hour as shown at 54, the program processes all orders in the PENDING database, as shown at 56.

Figure 5:
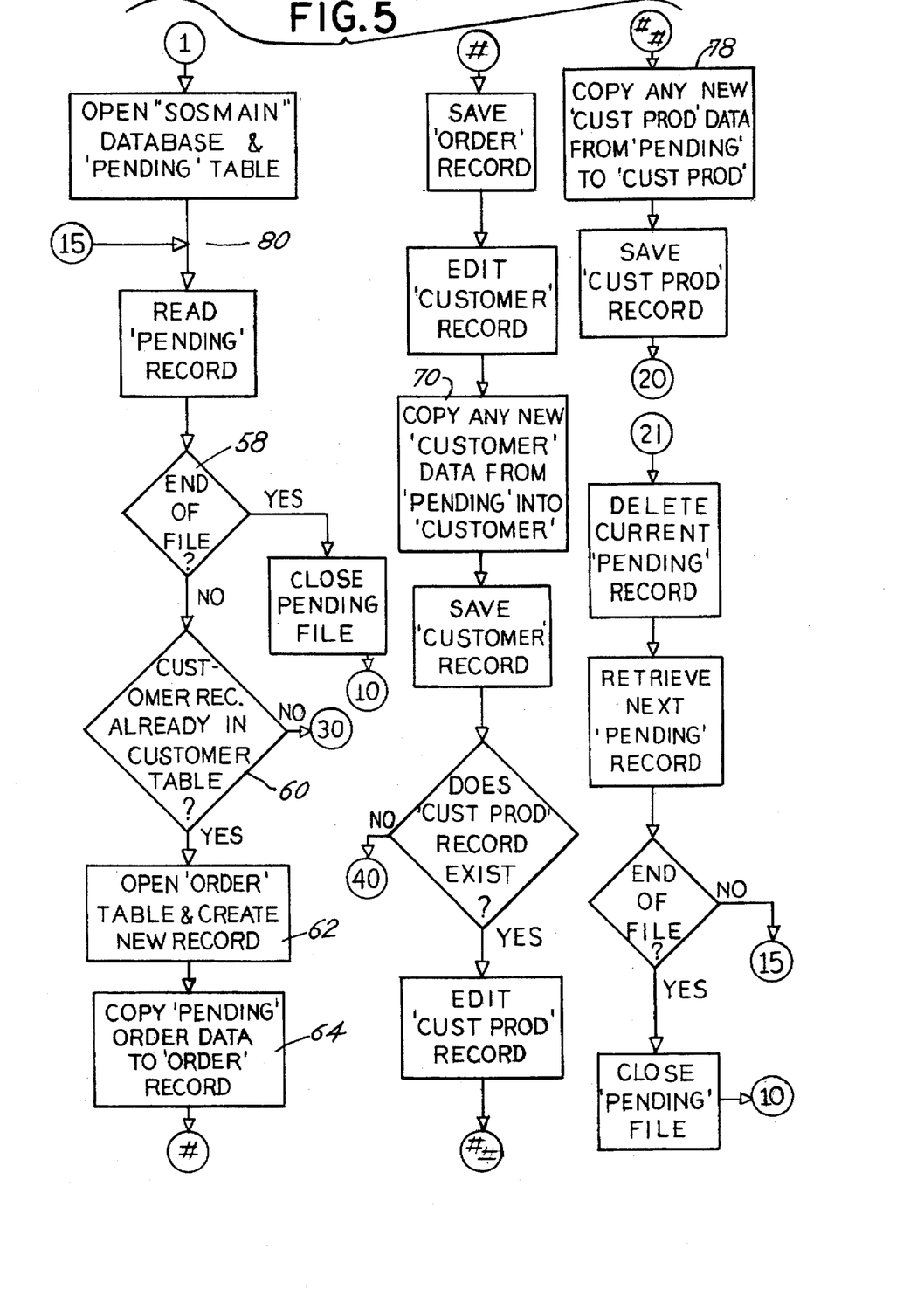
FIG. 5 is a flowchart further depicting operation of the software of the preferred embodiment of the invention.

Referring to FIG. 5, if no records are found in the PENDING file, the program closes the file and waits for the next interval, as seen at 58. Otherwise, the system searches a database called SOSMAIN for existing customer records, as seen at 60, and process records from PENDING database into SOSMAIN accordingly. SOSMAIN is a relational database containing tables called "Customer," "CustProd," and "Orders." The program looks in the Customer table to see if it can find a CustID entry that matches the CustID entry in the pending order record. If SOS finds a match it then creates a new Orders record, as seen at 62, and updates the existing Customer record if any Pending data indicates any changes, as seen at 70. If no customer record is found, the system creates a new customer record, as shown at 72 on FIG. 6, a new CustProd record, and a new Order record, as shown at 74.

Figure 6:
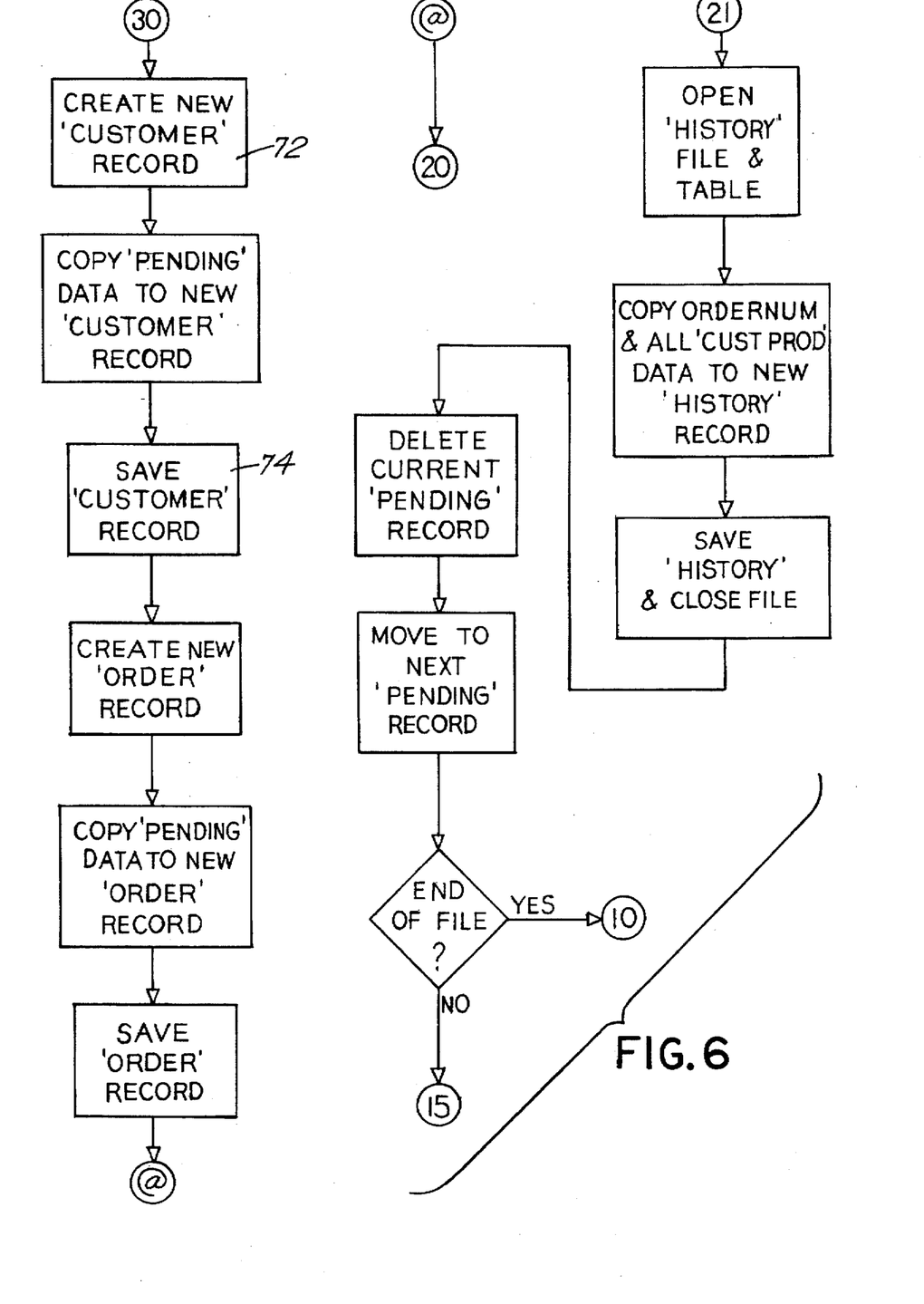
FIG. 6 is a flowchart further depicting operation of the software of the preferred embodiment of the invention.
Figure 7:
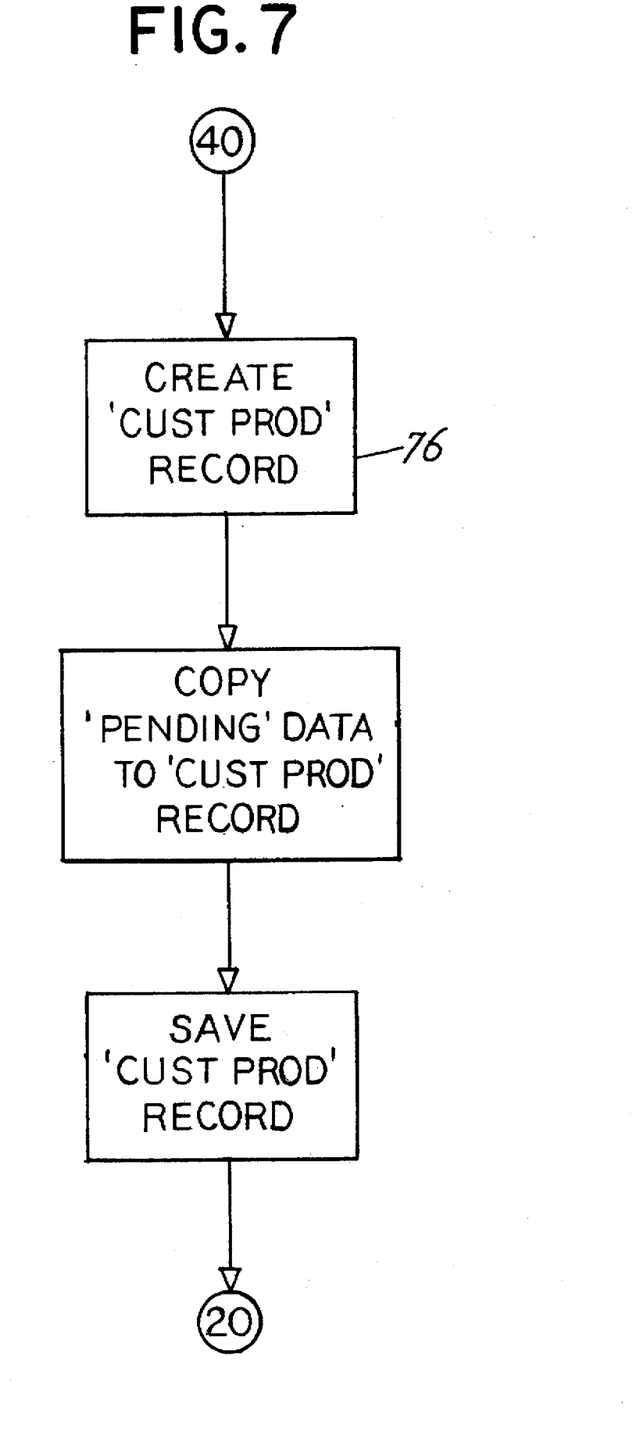
FIG. 7 is a flowchart further depicting operation of the software of the preferred embodiment of the invention.

The program also searches for a matching CustProd record with the same CustID and product code (ProdCode). If none exists it creates one, as seen at 76. If one exists, SOS updates this record if the Pending data indicates any changes, as seen at 78.

The program then deletes the record from the PENDING database, moves to the next pending order, as seen at 80, and repeats the entire process. When there are no more pending orders, the program closes all files and waits for the next timed interval. The TeleForm program holds orders that are incomplete or flawed for correction by an operator. The program may also be designed to print reports of errors, for example orders for non-existent patterns, or incomplete or flawed data.

After this information is stored to the SOSMAIN database, the program generates an entry or subfile or data record in the ORDERS. DAT file compatible for use with an appropriate automated cutting table. This file should contain for each order a pattern name and order number. The format of this ORDERS DAT file is a simple flat (text) file in a comma separated value (CSV) format. Each line in the file consists of at least an order number and pattern name representing one garment. A database or memory at the cutting table site which stores the actual physical dimensions associated with each pattern (or variations of a set of base patterns) by pattern name. The system thus instructs the table to cut the pieces of fabric in that description.

For example, Gerber Garment Technology, Inc. and Cutting Edge make automated cutting tables that can receive electronic file inputs. These tables typically include a computer with a digital storage memory that stores a pattern database with multiple pattern parameters corresponding to various sizing data.

A pattern maker develops the physical dimensions associated with each pattern. The pattern maker uses the appropriate paper pattern template, as shown in FIG. 2, and traces the base pattern size (the smallest dimensions of a particular Master Model unit) with a digitizing table, the applying "grade rules" to determine all the possible size variations from a pattern. As each combination of measurements is calculated, it is assigned a pattern name. This information is stored on a CD-ROM, optical disk, or other high-capacity storage device. The SOS program has a routine that generates corresponding pattern names on demand.

The system also keeps track of individual clerks, or fashion consultants in a data field. This information can be analyzed as necessary to determine whether particular clerks are associated with inaccurate sizing measurements, and improves efficiency and product quality.

The system may also keep track of historical data in a HISTORY file. This file can be used to collect data about particular sizes ordered and permits study of actual sizes requested by consumers. It can also be used to track sizing trends over time. With this sizing and trend information, garment manufacturers can more reliably estimate the demand by size of various garments.

The data structures in the preferred embodiment are as follows:

Structure of Table Customer:

| Field Name | Description | Type | Length |
| --- | --- | --- | --- |
| CustID | Customer number | Text | 08 |
| CustPhone | Customer phone number | Text | 14 |
| CustFirstName | Customer first name | Text | 15 |
| CustMI | Customer middle initial | Text | 01 |
| CustLastName | Customer last name | Text | 20 |
| CustStreet | Customer street address | Text | 35 |
| CustCity | Customer city | Text | 25 |
| CustState | Customer state | Text | 02 |
| CustZIP | Customer ZIP code | Text | 10 |

Structure of Table CustProd:

| Field Name | Description | Type | Length |
| --- | --- | --- | --- |
| CustID | Customer number | Text | 08 |
| ProdCode | Product Code | Text | 01 |
| MM_UnitID | Master Model unit number | | |
| MPt1-MPt12 | Measurement data | Integer | |

(This table can hold measurements for a number of different garment types. The ProdCode tells SOS how to interpret the numbers.)

Structure of Table Orders:

| Field Name | Description | Type | Length |
| --- | --- | --- | --- |
| Cust-ID | Customer number | Text | 08 |
| ProdCode | Product Code | Text | 01 |
| OrderNum | Order number | Text | 10 |
| FCNum | Fashion Consultant/ Sales clerk ID | Text | 10 |
| OperID | Computer operator ID | Text | 10 |
| OrderDate | Date order taken | Text | 06 |
| CSID | Sending fax phone number | Text | 20 |
| Time_Stamp | Date/time order transmitted | Text | 20 |

The TeleForm program can also verify the data before it is processed. The TeleForm uses screen representations of the actual order forms. Orders input this way would go to the PENDING database just as faxed orders would. With all orders in the same PENDING file, the program can be limited to processing orders in the PENDING database file via a background function performed on a regular schedule. For example, the TeleForm can be programmed to calculate order numbers and customer numbers, and look at specific database tables to verify entries on order forms.

It is to be understood that the specific mechanisms and techniques that have been described are merely illustrative of preferred applications of the principles of the invention. Numerous modifications, additions and substitutions may be made to the methods and apparatus without departing from the true spirit and scope of the invention.

We claim:

1. A system for providing custom tailored garments for a customer comprising in combination:

a measuring unit for gathering size data corresponding to said customer, said measuring unit adapted to be worn and including adjustable overlapping seams to enable said customer to obtain a proper fit and drape, said unit comprising, in combination:
- a plurality of means associated with said seams to hold the sizing unit in a fit desired by the wearer; and
- a plurality of indicia associated with said holding means to identify the positions of the seams as necessary to obtain said desired garment size;
- a data collection device for collecting input data comprising said size data, customer data corresponding to said customer, and product data corresponding to a made-to-order garment;
- a first data storage memory for storing said input data, said data storage memory defining a pending database for temporary storage of said input data, and a main database comprising a plurality of relational tables relating said customer data, said size data and said product data;
- a text output file containing a plurality of data records, each of said data records corresponding to an order for a made-to-order garment, each of said data records comprising at least one data field corresponding to garment sizing parameters;
- a data processing unit comprising a data processor, said data processor periodically transferring data from said pending database to said main database, generating said text output file, updating said text output file to include additional data records corresponding to additional customer orders, and supplying said text output file to pattern making software or an automated cutting table for cutting made-to-order garments.

2. A system as in claim 1 wherein said measuring unit is remotely located from said data processing unit, said system further comprising a communication channel for transmitting said input data from said data collection device to said data storage memory.

3. A system as in claim 2 further comprising a history database for storage of said size data for analysis of sizing patterns and trends.

4. A system as in claim 1 wherein each of said text output data records further includes a second data field corresponding to an order number.

5. A system as in claim 4 wherein said system further comprises a second data storage memory including a pattern database storing a plurality of pattern parameters, each of said plurality of pattern parameters corresponding to a plurality of size measurements, said system assigning a pattern number based on said plurality of size measurement, said processing unit storing said pattern number in said text output data records, said automated cutting table cutting looking up said pattern number and cutting a made-to-order garment based on said pattern number.

6. A system as in claim 5 wherein said data processing unit further comprises a display device for displaying information stored in said first and second data storage memories.

7. A system as in claim 6 wherein said unit further comprises a verification means for verifying that said input data is in proper format and generating an error message in response to improper or incomplete input data.

8. A system as in claim 7 wherein said data processing unit detects a timing signal and generates a run batch signal in response to said timing signal causing said data processing unit to update said output text file.

9. A system as in claim 8 wherein data in said pending database is deleted from said first storage memory after said updating of said text output files.

10. A system as in claim 1 wherein said data processing unit further includes a keyboard for manual entry of said customer data and product data.

11. Apparatus for generating a garment output text file in response to input data, said input data including measurement data and customer information data, comprising in combination:
- means for gathering said measurement data relating to desired garment size;
- means for storing said measurement data and said customer information data in a relational main database;
- means for generating a customer table, a product table, and an order table corresponding to said customer information data and said measurement data, said customer table, said product table and said order table relationally related in said main database;
- means for periodically generating output text data records corresponding to said measurement data
- means for periodically storing said output text data records in said output text file;
- means for periodically providing said garment output text file to pattern making software or an automated fabric cutting table; and
- a sizing garment adapted to be worn and having adjustable overlapping seams to enable the wearer to obtain a desired fit, said garment including:
  - a plurality of means associated with said seams to hold the sizing garment in a fit desired by the wearer, and
  - a plurality of indicia associated with said holding means to identify the positions
  - of the seams as necessary to obtain said desired fit.

12. A method for generating individually sized garments comprising the steps in combination of:
- forming at least one sizing garment for each of a plurality of sizes, said garment being partially finished and having at least one overlapping and open seam;
- placing a plurality of holding means at predetermined locations along said open seams, said sizing garment adjustable to a plurality of sizes;
- associating first indicia with each of said holding means to identify the position of said open and overlapping seams;
- measuring a customer with one of said sizing garments;
- receiving order information corresponding to said indicia on said sizing garment;
- receiving customer information;
- storing said order information and said customer information in a relational database in a computer memory;
- retrieving data from said relational database and creating a corresponding order instruction;
- storing said order instruction in an output file;
- updating said output file with additional order instructions;
- providing said output file to an automated cutting table.

13. A method as in claim 12 further including the steps of periodically storing said order information in said relational database, periodically updating said output file, and periodically providing said output file to an automated cutting table.

14. A method as in claim 13 further including the steps of storing said order information in a history database for analysis of preferred sizing parameters and trends.

* * * * *